United States Patent
Devaux et al.

(10) Patent No.: US 6,484,937 B1
(45) Date of Patent: Nov. 26, 2002

(54) METHOD FOR STORING DATA IN A CHIP CARD REWRITABLE MEMORY

(75) Inventors: François Devaux, L'Hay les Roses; Daniel Perrot, Maurepas, both of (FR)

(73) Assignee: Oberthur Card Systems SA, Paris (FR)

( * ) Notice: Subject to any disclaimer, the term of this patent is extended or adjusted under 35 U.S.C. 154(b) by 0 days.

(21) Appl. No.: 09/355,939

(22) PCT Filed: Feb. 13, 1998

(86) PCT No.: PCT/FR98/00279
§ 371 (c)(1),
(2), (4) Date: Aug. 16, 1999

(87) PCT Pub. No.: WO98/36387
PCT Pub. Date: Aug. 20, 1998

(30) Foreign Application Priority Data

Feb. 14, 1997 (FR) .............................. 97 01735

(51) Int. Cl.[7] .................................. G06K 5/00
(52) U.S. Cl. ................ 235/380; 235/492; 235/451; 711/161; 711/173
(58) Field of Search ................ 235/380, 492, 235/451; 711/161, 173

(56) References Cited

U.S. PATENT DOCUMENTS

| | | | | |
|---|---|---|---|---|
| 4,859,838 A | * | 8/1989 | Okiharu | 235/383 |
| 4,894,522 A | * | 1/1990 | Elliott | 235/472 |
| 5,172,314 A | * | 12/1992 | Poland et al. | 235/375 X |
| 5,226,145 A | * | 7/1993 | Moronaga et al. | 395/425 |
| 5,335,170 A | * | 8/1994 | Petteruti et al. | 235/472 X |
| 5,365,045 A | | 11/1994 | Yasuo | |
| 5,473,146 A | * | 12/1995 | Goodwin, III | 235/383 |
| 5,537,312 A | * | 7/1996 | Sekiguchi et al. | 235/383 X |
| 5,721,421 A | * | 2/1998 | VanDonkelaar | 235/462 |
| 5,745,705 A | * | 4/1998 | Iguchi | 235/383 X |
| 5,751,257 A | * | 5/1998 | Sutherland | 235/383 X |
| 5,777,315 A | * | 7/1998 | Wilz et al. | 235/472 |
| 5,809,558 A | * | 9/1998 | Matthews et al. | 711/173 |
| 5,937,423 A | * | 8/1999 | Robinson | 711/103 |
| 6,035,380 A | * | 3/2000 | Shelton et al. | 711/163 |
| 6,161,760 A | * | 12/2000 | Marrs et al. | 235/462.15 |

FOREIGN PATENT DOCUMENTS

| | | | |
|---|---|---|---|
| EP | 446 940 | | 9/1991 |
| EP | 622 736 | | 11/1994 |
| JP | 8044870 A | * | 2/1996 |
| JP | 09006853 A | * | 1/1997 |
| JP | 0925581 A | * | 10/1997 |

* cited by examiner

*Primary Examiner*—Karl D. Frech
*Assistant Examiner*—Allyson Sanders
(74) *Attorney, Agent, or Firm*—Oblon, Spivak, McClelland, Maier & Neustadt, P.C.

(57) ABSTRACT

A storage process that includes adding, to the elementary files of fixed length provided for by, e.g., ISO Standard 7816-4, elementary files of variable length whose capacity is always adapted to the size of the records they store, and managing this new type of file with micro-instructions complying with the formalism of ISO Standard 7816-4 and belonging to the proprietary class of instructions. By virtue of this new type of variable-length elementary file, it is possible to envisage new smartcards complying with ISO Standard 7816-4 and implementing data compression techniques at the data storage level, this capability being particularly beneficial considering the limited data storage capacities of a smartcard.

9 Claims, 2 Drawing Sheets

METHOD FOR STORING DATA IN A CHIP CARD REWRITABLE MEMORY

BACKGROUND OF THE INVENTION

1. Field of the Invention

Figure 1:
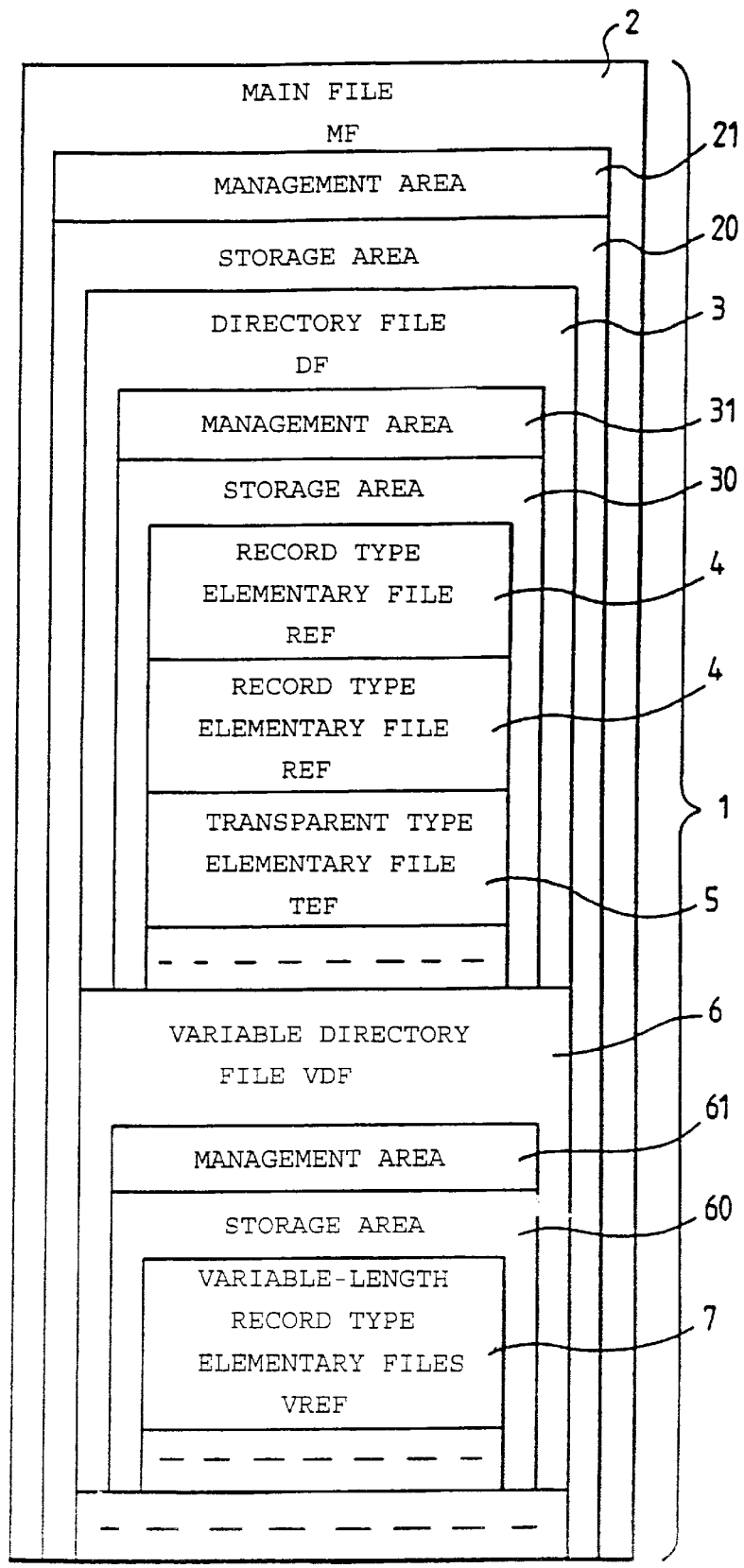

The present invention relates to the storage of data in a microprocessor smartcard.

2. Description of the Background Art

Smartcard are generally cards with the format of a credit card or tokens fitted with an electronic microcircuit, based on memories and a microcontroller, these being devised so as to allow the running of a for example bank or health transaction. They communicate with their environment by means of readers with which they exchange messages and comply with ISO Standard 7816-4. To make a transaction run, they need to preserve and update a certain number of items of information in a reprogrammable built-in memory termed an EEPROM (Electrically Erasable Programmable Read Only Memory).

Hitherto, the storage of data in the EEPROM of a smartcard has been organized by ISO Standard 7816-4 into three levels of files:

- a first level termed the main file consisting of the accessible part of the space of the EEPROM memory, provided with a defining header and with headers for tagging the second-level files which it contains;
- a second level of directory files (or dedicated file) each provided with a defining header and with headers for tagging the third-level files which it contains, and
- a third level of so-called elementary files which are of two types: either of transparent type, the data of the records not being structured within the file, write and read addressing being delegated to the application program controlling the transaction running in the smartcard, or of record type, the data being stored in fixed-size blocks managed by the operating system of the microcontroller of the smartcard.

With a system for storing data in a smartcard EEPROM memory, as governed by ISO Standard 7816-4, the application program controlling the transaction running in the smartcard must know the sizes of the data blocks which it proposes to store in the EEPROM memory of the smartcard since the two types of elementary files permitted, in which the data are actually stored, are of fixed length. This limitation precludes the compression of data within the smartcard since, in this case, the application program controlling the transaction running in the smartcard no longer has control over the length of the data blocks after compression which will actually be stored.

SUMMARY OF THE INVENTION

The purpose of the present invention is to avoid this limitation by creating a new type of third-level file termed a variable-length elementary file (or Record Variable File) managed by proprietary instructions of ISO Standard 7816-4, doing so in order to maintain upward compatibility with this standard.

Its subject is a process for storing data in a rewritable smartcard memory, characterized in that it consists in storing the data at least in part in elementary files of variable lengths each made up of a variable-length chain of domains of fixed lengths and of low individual capacities of the rewritable memory, the said chain having its domains tagged by means of a domain allocation table which changes as a function of the number of data items actually stored.

Advantageously, the said elementary record files of variable lengths form part of larger directory files, of variable type, containing their tables for allocating domains which each consist of a header placed in a management area of the host directory file and locating the start of chain, and of links placed at the start or at the end of each domain identifying the relevant domain's membership of a chain, that is to say its occupancy, and locating the next domain in the chain.

Advantageously, the said elementary files of variable lengths coexist together with the elementary files of fixed lengths within distinct directory files and are managed by an operating system responding to commands consisting of several successive fields: an instruction class field, an instruction field and a parameter field, the instruction class making it possible to distinguish a directory file of variable type containing files of variable lengths from directory files of fixed type containing files of fixed lengths so that each elementary file is managed according to its kind, by the operating system either alone, or under the dependence of an application program intervening at a higher level.

Figure 2:
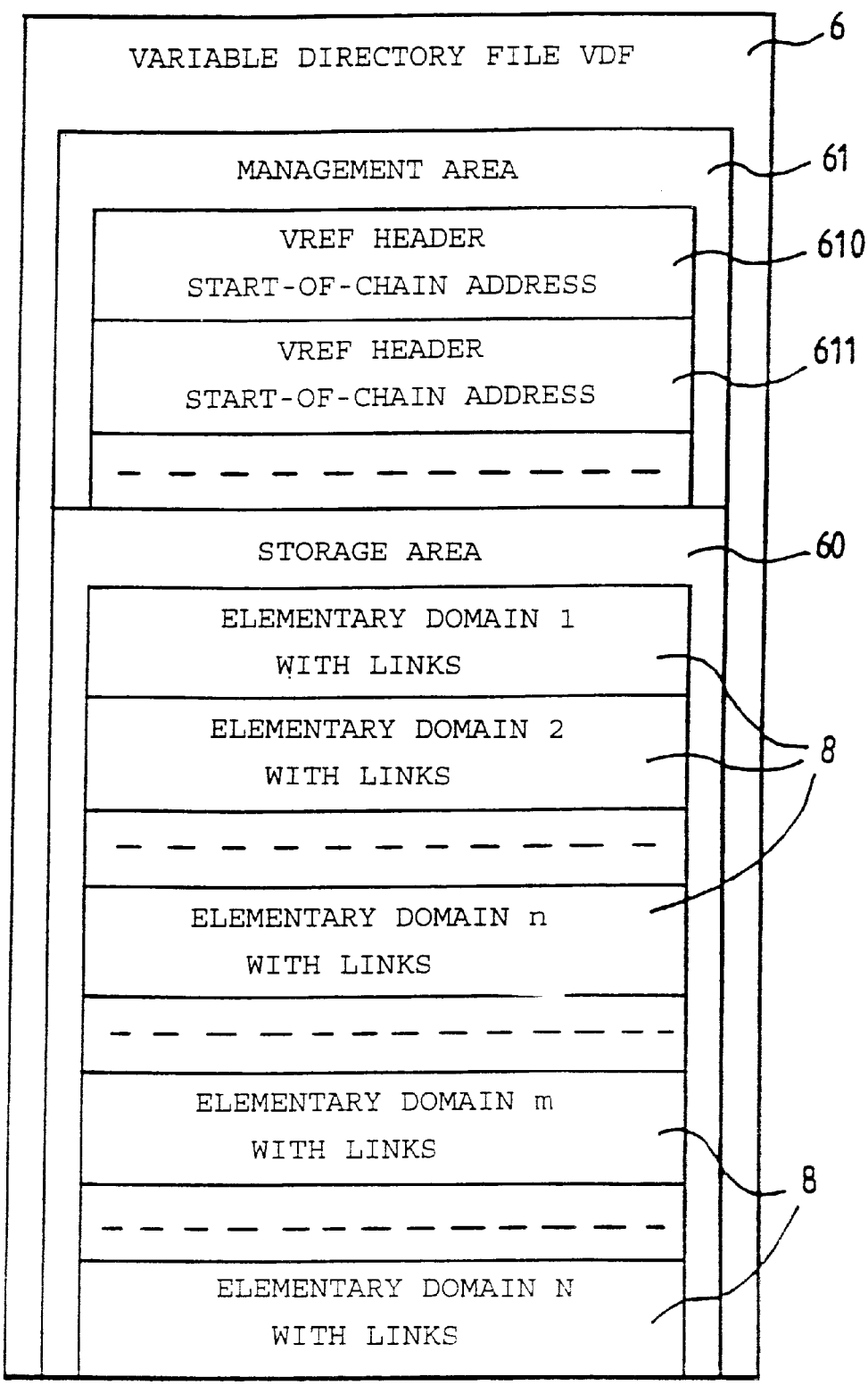

Other characteristics and advantages of the invention will emerge from the description below of an embodiment given by way of example. This description will be given in conjunction with the drawing in which:

BRIEF DESCRIPTION OF THE DRAWINGS a FIG. 1 diagrammatically illustrates a smartcard rewritable read only memory occupancy plan such as it results from a process for storing data on smartcard according to the invention, upwardly compatible with ISO Standard 7816-4, and a FIG. 2 details the make-up of a directory file of variable type appearing in FIG. 1.

DETAILED DESCRIPTION OF THE INVENTION

According to ISO Standard 7816-4, the storage of data in a smartcard EEPROM type rewritable memory is carried out with the aid of a file system organized in three levels:

- a first level consisting of a main file "Main File MF" 2 occupying all the accessible part 1 of the memory space of the EEPROM memory with a storage area 20 supplemented with a management area 21,
- a second level of directory files "Dedicated file DF" 3 likewise with a storage area 30 supplemented with a management area 31. These directory files DF 3 occupy the storage area 20 of the main file MF 2 with, in the management area 21 of the main file 2, headers cataloguing and pinpointing the directory files DF 3 within the main file 2 (directory file start addresses, sizes of the directory files, etc.), and
- a third level of elementary files "Elementary File EF" 4, 5 occupying the storage areas 30 of the directory files DF 3 with, in the management area 31 of the directory files DF 3 which they accommodate, headers cataloguing and pinpointing the elementary files EF 4, 5 within the directory files DF 3 (types of the elementary files, addresses of the starts of the elementary files EF 4, 5, sizes of the elementary files, etc.).

However, according to ISO Standard 7816-4, the elementary files are of two types: the so-called record elementary files "Record EF" 4 of fixed sizes in which the data are stored in blocks of fixed sizes and the so-called transparent elementary files "Transparent EF" 5 also of fixed sizes, in which the data are not structured, the relative write and read addressing being delegated to the application program controlling the running of a transaction in the smartcard.

With such a storage system comprising only elementary files of record 4 or transparent 5 type, the application program controlling the running of a transaction with the aid of a smartcard must know the length of the blocks of data to be stored in the card. This removes any benefit from the data compression processing implemented at the lower level of the operating system since the application program controlling the running of a transaction is unaware of the result of a compression at the level of the operating system and cannot take account thereof in order to save room during memory writes to the smartcard. Nevertheless, data compression at the level of the operating system seems to be especially indicated for a smartcard on account of the limitations in the latter's data storage capacities. To remedy this limitation, it is proposed to create a new type of variable-length elementary file, and to add it to the existing elementary file types of fixed lengths whilst continuing to comply with ISO Standard 7816-4 to maintain upward compatibility between smartcards.

The new type of variable-length elementary file VREF 7 is based on the make-up of a variable-length chain of elementary domains 8 of low unit capacity and of fixed lengths sharing the storage area 60 of a directory file 6 of a new type referred to as a variable directory file VDF 6 created especially for the purpose, the structure of which is detailed in FIG. 2.

This variable directory file VDF 6 is distinguished from the conventional directory files DF 3 by a specific identifier written in the header reserved therefor in the management area 21 of the main file MF 2. Like the conventional directory files DF 3, it has a storage area 60 supplemented with a management area 61.

The storage area 60 of a variable directory file VDF 6 is split up into elementary domains 8 of equal length and low capacity and may contain a variable number of variable-length files VREF 7. These elementary domains, for example multiples of 16 bytes, exhibit, at the start or end, a zone of one or two bytes excluded from the storage of data and reserved for links intended for chaining. These links give the state of occupancy or of non-occupancy of each elementary domain as well as the address of the next elementary domain, when the elementary domain under consideration is part of a chain forming a variable-length elementary file VREF 7 and when it is not the last in the chain, the next elementary domain not necessarily being contiguous. The links of an elementary domain consist, for example, of a number taking the value 0 to signify the non-occupancy of the relevant domain, the value of a domain address tagging the next domain with which the relevant domain is chained, or a particular value greater than the addresses of the domains signifying the end of a chain.

The management area 61 of a variable directory file VDF 6 contains headers 610, 611 of variable-length elementary files VREF 7 incorporating mainly the start address of the chain of elementary domains 8 of the storage area 60 and assigned to the relevant variable-length elementary file.

The creation of a variable directory file VDF 6 is achieved by:

the writing to the management area 21 of the main file MF 2 of a header assigned to this variable directory file, identifying it and reserving a certain location for it in the storage area 20 of the main file MF 2. This header is the one described by ISO Standard 7816-4 but its type becomes variable DF type, the splitting of the reserved location into a management area 61 and a storage area 60, the writing to the new management area created 61 of a certain number of characteristics of the new variable directory file, viz. the size of the directory of the headers of elementary files of variable lengths, a global erasure indicator, the size of its elementary domains, the address of the first elementary domain, etc., and the formatting of the new storage area 60 into elementary domains with initialization of the links.

Once a variable directory file VDF 6 exists, the creation of a variable-length elementary file is achieved by:

identifying the file by assigning a header in the management area 61 of the relevant variable directory file VDF 6, with an ISO 7816-4 standard "id-file" identifier and tagging the first free elementary domain found in the storage area with a view to being assigned thereto, the positioning of an erasure indicator and writing the data assigned to the file, commencing with the first tagged free elementary domain and then overflowing into other free domains until the data to be written are exhausted, together with, at each jump of elementary domain, the writing of the address of the next domain to the links of the elementary domain which has just been exited and the updating of the occupancy identifier in the links of the next elementary domain.

A variable-length elementary file of length adapted on each occasion to the precise quantity of data to be stored is thus created by chaining together longer or shorter elementary domains of low capacities.

In the case of a conventional REF or TEF file of fixed length, the number of records, that is to say of partial writes of the file, is fixed once and for all, the creation of the file involving the reservation of a memory capacity which is not necessarily used immediately and which becomes unavailable for the creation of other files. This is no longer the case with a variable-length file VREF which occupies only the memory capacity strictly necessary for the records which it incorporates and which leaves the unused memory free for other files.

The management of the transparent elementary files TEF 5, conventional record files REF 4 or variable-length files VREF 7, that is to say their creation, writing, reading, erasure, deletion, is carried out in a conventional manner by means of routines of the operating system of the microcontroller of the smartcard which are called by way of the command interpreter of the operating system by means of commands complying with the formalism of ISO Standard 7816-4, that is to say with writing made up of several successive fields: an instruction class field, an instruction field and a parameter field. Preferably, the usual commands of ISO Standard 7816-4 are used for the management of the transparent TEF and record REF elementary files, and the same commands with a proprietary instruction class field for the elementary files of variable lengths. By virtue of this, upward compatibility is obtained with smartcards complying with ISO Standard 7816-4 and which are aware of only the two usual types of elementary files, namely the transparent elementary files TEF and the record elementary files REF.

Obviously, the writing or erasing of a variable-length elementary file complies with the usual security rules.

A file creation or a write is carried out only if there is the room necessary for the action to be performed. A write which has commenced must terminate in order to be validated. This is achieved, in accordance with Standard 7816-4, by means of an auxiliary activity bit placed in the file-related header, set to one before the envisaged action and reset to zero after the end of the action. If the activity bit is held at one after an action, the file is declared invalid and can no longer be accessed. Finally, a maximum record size is provided for in the management area of the host variable directory file VDF so as to monitor the data transfers.

Likewise, an erasure which has commenced must be completed in order to be validated. This is achieved by means of an erasure bit placed in the file-related header, set to one before the erasure which consists in reinitializing the links of the elementary domains belonging to the chain making up the file, then reset to zero at the end of the action just before deleting the file header. If a file erasure action is interrupted by the smartcard being withdrawn inopportunely from its reader, the erasure bit signals this and allows the completion of the interrupted erasure action prior to any subsequent use of the smartcard.

Of course, the invention is not limited to the embodiment described but extends to all variants which are within the scope of the person skilled in the art. The links of the elementary domains which make up a kind of domain allocation table may be taken out of the storage area of the directory file of host variable type and brought together in a zone of its management area.

What is claimed is:

1. A process for storing data in a rewritable memory of a smartcard, comprising:

storing the data at least in part in elementary files of variable length each made up of a variable-length chain of domains of fixed length and of low individual capacities of the rewritable smartcard memory; and tagging the chain of domains by a domain allocation table that changes as a function of a number of data stored.

2. The process according to claim 1, wherein the elementary files of variable length are located in the rewritable smartcard memory of a smartcard within directory files of variable type containing domains and domain allocation tables larger than the elementary files.

3. The process according to claim 2, further comprising chaining by way of links, wherein the domain allocation table includes a header placed in a management area of a host variable directory file locating an address of a start-of-chain domain in the host variable directory file, and the links are placed in locations reserved in each domain of the host variable directory file identify each domain's membership in a chain.

4. The process according to claim 1, wherein the chain of domains have a capacity that is at least one of equal to 16 bytes and a multiple of 16 bytes.

5. The process according to claim 3, wherein the links occupy between one and two bytes in each domain.

6. The process according to claim 3, wherein the links of a domain incorporate at least one of a number taking a value of 0 to signify non-occupancy of a relevant domain, a value of a domain address tagging a next domain with which the relevant domain is chained, and a particular value greater than addresses of the domains signifying an end of a chain.

7. The process according to claim 1, wherein management of the elementary files of variable length is carried out by routines of an operating system that are called by specific commands that are understood by a command interpreter of an operating system and employ within their formulations an instruction class field, an instruction field, and a parameter field.

8. A process for storing data in a rewritable smartcard memory, comprising:

storing the data in part in elementary files of variable length each made up of a variable-length chain of domains of fixed length and of low individual capacities of the rewritable memory of a smartcard;

tagging the chain of domains by a domain allocation table that changes as a function of variations in the number of data stored; and storing the data in part in elementary files of fixed length.

9. The process according to claim 8, wherein the elementary files of variable length and the elementary files of fixed length are located in the rewritable memory of a smartcard in directory files of larger capacities than of the elementary files, variable directory files containing the domains and domain allocation tables for allocating domains of the elementary files of variable length, fixed directory files containing the elementary files of fixed length, and headers identifying the elementary files of fixed length by their start addresses and by an indication of their capacities.

* * * * *